Jan. 27, 1970  L. B. TAPLIN ET AL  3,491,797
TEMPERATURE SENSOR
Original Filed June 25, 1963

LAEL B. TAPLIN
WALTER F. DATWYLER JR
THOMAS E. THOMPSON
JOSEPH P. MADURSKI
INVENTORS

BY W.S. Thompson

ATTORNEY 3,491,797
TEMPERATURE SENSOR
Lael B. Taplin, Walter F. Datwyler, Jr., Joseph P. Madurski, and Thomas E. Thompson, Southfield, Mich., assignors to The Bendix Corporation, a corporation of Delaware
Original application June 25, 1963, Ser. No. 290,894, now Patent No. 3,302,398, dated Feb. 7, 1967. Divided and this application Jan. 11, 1967, Ser. No. 608,605
Int. Cl. F15c 1/14; G01k 1/08
U.S. Cl. 137—81.5                                              1 Claim

ABSTRACT OF THE DISCLOSURE

The present invention consists of a self-oscillating stream interaction pure fluid amplifying component having a delay line feedback control circuit establishing the frequency of oscillation responsive to temperature interior and/or exterior the delay line. The device produces a fluid pulse output having a frequency variable with sensed temperature which can be utilized by other pure fluid components operating on a digital information mode.

Cross references

The present invention is a division of co-pending U.S. application Ser. No. 290,894, filed June 25, 1963 entitled "Fluid Pulse Control" now U.S. Letters Patent 3,302,398.

Background

The invention relates to pure fluid stream interaction amplifiers sometimes termed fluidics.

Basic pure fluid stream interaction amplifiers are known and illustrated in such prior patents as U.S. 3,016,063 and 3,053,276. The present invention extends these known techniques to provide a device for the specific purpose of sensing temperature.

Summary

The present invention provides a needed sensing component for pure fluid systems and secures the general advantages of pure fluid components which are long life, resistance to environment wide range of material choices and the like. Compared to known temperature sensors, the present invention is nearly instantaneous in reacting to temperature changes.

Description of the preferred embodiments

Figure 1:
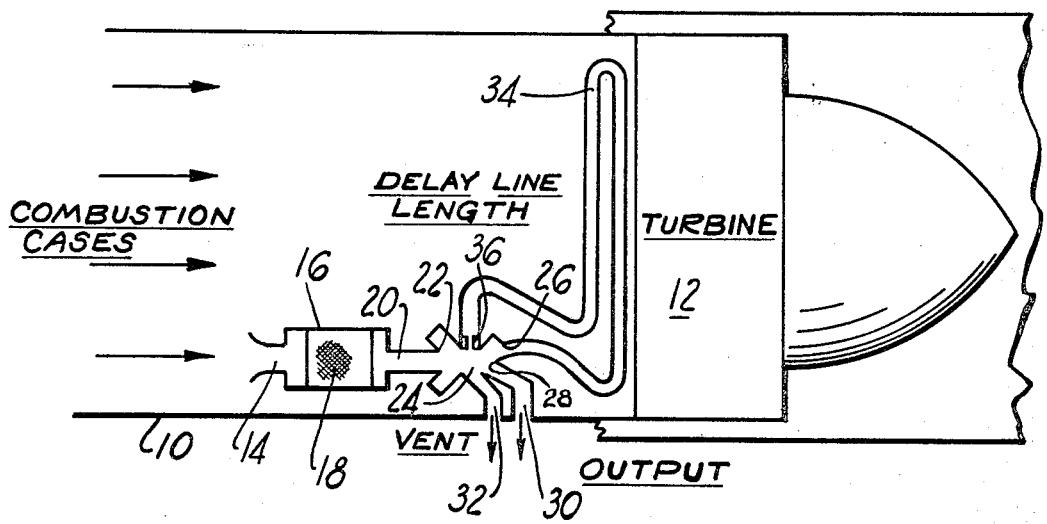
FIGURE 1 illustrates schematically a first embodiment of my temperature sensor in a typical gas turbine installation wherein the sensed fluid temperature medium and operating fluid are the same.
Figure 2:
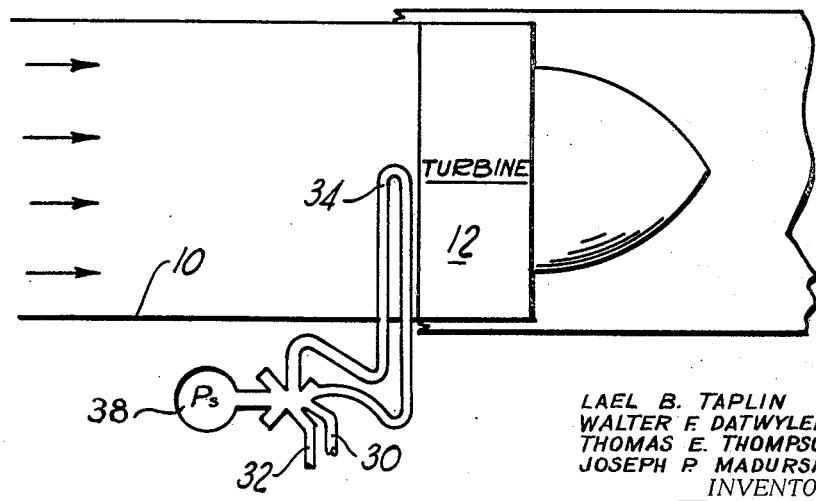
FIGURE 2 is a second embodiment of my invention wherein sensed fluid temperature and operating fluid are separate fluid mediums.

Two modifications of a temperature sensor are shown in FIGURES 1 and 2 for producing a pneumatic pulse output having a frequency variable with temperature.

In the FIGURE 1 modification, the temperature sensor is located entirely within engine casing 10 just upstream of turbine 12 which in a gas turbine engine is normally the most severe temperature location. High pressure combustion gases are utilized as a high pressure source and are received by a high pressure intake opening 14 arranged in the flow stream. A filter chamber 16 having a screen filter 18 removes solid impurities from the combustion gases and the fluid is then transmitted by passage 20 to main supply jet 22. On the opposed side of receiving chamber 24 from main supply jet 22 are two receiving apertures; first feedback receiver 26 which normally receives the main supply stream; and second, output receiver 28 offset downwardly from the main supply stream and connected to output transmission line 30. Additionally, a vent passage 32 is connected to receiver chamber 24 and exhausts to the atmosphere. Feedback receiver opening 26 permits flow into delay line 34 having a predetermined length and arranged in the flow path of combustion gases. Delay line 34 forms a feedback circuit and terminates in control jet 36 opening into receiver chamber 24 generally transverse of the main supply stream and offset therefrom on a side opposite output receiver 28.

In operation, the main supply ejected by jet 22 traverses receiver 24 and enters feedback opening 26 into delay line 34. A fluid pulse travels through the delay line at approximately the velocity of sound and is ejected by control jet 36 where it deflects the main supply stream downwardly into output receiver 28, producing an output pulse. When deflected downwardly, the flow into delay line 34 is interrupted which interruption, after a time delay, will cause an interruption in the deflecting signal from control jet 36 allowing the main stream flow to snap back to its original position, thus terminating the output pulse and starting a new pulse generation cycle. The main supply stream will continue to oscillate between output receiver 28 and feedback receiver 26 at a frequency established by the time delay in line 34 which is dependent not only on line dimensions, but also on the velocity or speed of sound of the gas. However, the speed of sound of the gas is dependent on its temperature, and if this temperature is varied, the time required for the pulse to traverse the delay line 34 is altered, thus changing the period of oscillation of the main stream from output to feedback receiver and thereby changing the pulse output frequency. In the FIGURE 1 device, the temperature of fluid in delay line 34 is affected both by the fact that hot combustion gases pass over the exterior surface of the delay line and further because the combustion gas is utilized as the high pressure source and comprises the fluid medium within line 34.

In FIGURE 2, the temperature sensor utilizes an independently supplied high pressure source $P_s$, from chamber 38 which replaces inlet 14 and filter 16 of the FIGURE 1 device. Only the delay line 34 is exposed to combustion gas temperature, and the sensor is otherwise the same as that of FIGURE 1 and corresponding parts are identically numbered. The temperature sensors thus comprise pneumatic oscillators having an output frequency variable with the temperature of fluid in the delay line which in turn is affected either by exposure of the delay line to the environment having the temperature to be measured, or also where the temperature environment is a high pressure gas, utilization of this gas as the high pressure sensor supply fluid.

The time required for a pulse to traverse the delay line 34 will be inversely proportional to the square root of gas temperature or a close approximation thereto. Thus, the duration of an output pulse will be inversely proportional to the square root of temperature as will be the time duration between pulses. As temperature increases and pulse duration is decreased along with the time duration between pulses, there will be more pulses per unit of time or a pulse frequency increase. Thus, pulse frequency is directly proportional to the square root of temperature. Since actual velocity is somewhat less than its theoretical velocity of sound, the square root relationship expressed should be considered as a theoretical relationship, and actual performance is an approximation to the expressed relationship.

With the present invention, it is possible to transmit logic by means of pulse frequency for compatibility with other components, or if desired, it will be recognized that the temperature sensors decribed herein would have utility for transmitting temperature logic inversely proportional to the square root of temperature by means of the pulse width or duration.

We claim:
1. A temperature sensor of the type employing fluidic switching devices for producing a pulse train output signal having a frequency that varies with sensed temperature comprising:
   a high pressure fluid supply source;
   a main supply jet connected to said source and ejecting a main fluid stream;
   a first receiver port normally receiving said main fluid stream;
   a delay line passage connected to said first receiver port on one end for normally receiving said main fluid stream;
   said delay line passage adapted to be placed in a fluid media having a temperature to be sensed;
   a control jet arranged generally transverse of said main fluid stream intermediate said main supply jet and said first receiver port;
   said control jet being offset to one side of said main fluid stream and connected at the other end of said delay line passage;
   a second receiver port offset from said main fluid stream on a side thereof opposite said control jet, an output passage connected to said second receiver port; and
   said main fluid stream operative to flow into said first receiver port, traverse said delay line passage in a time interval depending on temperature of said fluid media, and being ejected from said control jet deflecting said main fluid stream into said second receiver port producing an output pulse, said fluid media having a temperature to be sensed is a high pressure gaseous media, and said high pressure gaseous media comprises said high presure fluid supply source.

References Cited

UNITED STATES PATENTS

| | | | |
|---|---|---|---|
| 3,075,548 | 1/1963 | Horton | 137—81.5 XR |
| 3,185,166 | 5/1965 | Horton et al. | 137—81.5 |
| 3,396,619 | 8/1968 | Bowles et al. | 137—81.5 XR |
| 3,175,569 | 3/1965 | Sowers | 137—81.5 |
| 3,191,860 | 6/1965 | Wadey | 137—81.5 XR |
| 3,204,405 | 9/1965 | Warren et al. | 137—81.5 XR |
| 3,228,410 | 1/1966 | Warren et al. | 137—81.5 |
| 3,273,377 | 9/1966 | Testerman et al. | 137—81.5 XR |
| 3,314,294 | 4/1967 | Colston | 73—357 |
| 3,319,466 | 5/1967 | Lewis | 73—357 |
| 3,347,251 | 10/1967 | Gobhai | 137—81.5 |
| 3,348,562 | 10/1967 | Ogren | 137—81.5 |

SAMUEL SCOTT, Primary Examiner

U.S. Cl. X.R.

73—349